United States Patent
Engel et al.

(10) Patent No.: US 6,501,200 B2
(45) Date of Patent: Dec. 31, 2002

(54) MOTOR ARRANGEMENT

(75) Inventors: Wolfgang Engel, Königsfeld (DE); Arno Karwath, Rottweil (DE); Harald Reich, St. Georgen (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/859,571

(22) Filed: May 16, 2001

(65) Prior Publication Data

US 2001/0048254 A1 Dec. 6, 2001

(30) Foreign Application Priority Data

May 27, 2000 (DE) .......................... 200 09 553

(51) Int. Cl.[7] .............................................. H02K 11/00
(52) U.S. Cl. ......................... 310/68 R; 310/88; 318/254
(58) Field of Search ................................ 310/68 R, 88; 318/254

(56) References Cited

U.S. PATENT DOCUMENTS

| 3,383,574 | A | * | 5/1968 | Manteuffel | 318/138 |
|---|---|---|---|---|---|
| 4,211,962 | A | | 7/1980 | Grünleitner et al. | 318/254 |
| 4,334,189 | A | * | 6/1982 | Sato | 324/140 R |
| 4,484,127 | A | | 11/1984 | Salihi et al. | 318/802 |
| 4,726,746 | A | * | 2/1988 | Takada et al. | 417/366 |
| 4,823,034 | A | | 4/1989 | Wrobel | 310/67 R |
| 5,073,736 | A | * | 12/1991 | Gschwender et al. | 310/43 |
| 5,220,258 | A | * | 6/1993 | Hans et al. | 318/138 |
| 5,473,229 | A | * | 12/1995 | Archer et al. | 318/254 |
| 5,537,015 | A | * | 7/1996 | Karwath | 318/138 |
| 5,539,601 | A | * | 7/1996 | Farag | 361/23 |
| 5,821,706 | A | * | 10/1998 | Koga | 318/139 |
| 5,933,573 | A | | 8/1999 | Lukenich et al. | 388/811 |
| 6,008,602 | A | * | 12/1999 | Karwath | 318/138 |
| 6,169,378 | B1 | * | 1/2001 | Karwath | 318/138 |

FOREIGN PATENT DOCUMENTS

| DE | 23 46 380 | | 11/1974 | |
|---|---|---|---|---|
| DE | 36 33 479 | | 4/1987 | |
| EP | 318938 A2 | * | 6/1989 | H02P/6/02 |
| EP | 467085 A1 | * | 1/1992 | H02P/6/02 |
| EP | 0 769 844 | | 4/1997 | |
| WO | WO 9748177 A1 | * | 12/1997 | H02P/6/00 |

* cited by examiner

Primary Examiner—Joseph Waks
(74) Attorney, Agent, or Firm—Gudrun E. Huckett

(57) ABSTRACT

A motor arrangement has an electronically commutated motor of an explosion-protected design with a permanent-magnetic rotor, a stator, and an electronic commutation device. At least one galvanomagnetic rotor position sensor is arranged on the stator and separated from the permanent-magnetic rotor by an air gap, wherein the at least one galvanomagnetic rotor position sensor is configured to detect a magnetic field of said permanent-magnetic rotor and emits an output signal controlling said electronic commutation device. An opto-coupler transmits the output signal of the at least one galvanomagnetic rotor position sensor to the electronic commutation device. A current supply in the form of an ac system or a three-phase system supplies current to the at least one galvanomagnetic rotor position sensor. An isolating transformer is interconnected between the at least one galvanomagnetic rotor position sensor and the current supply.

20 Claims, 2 Drawing Sheets

MOTOR ARRANGEMENT

BACKGROUND OF THE INVENTION

1. Field of the Invention

The invention relates to a motor arrangement with an electronically commutated electric motor of an explosion-protected configuration, as they can be found, for example, in applications for driving fans in a potentially explosive atmosphere.

2. Description of the Related Art

In such motor arrangements, so-called safety barriers are conventionally used which, however, are too expensive for most applications. Also, voltage drops that are too high can occur for such safety barriers.

SUMMARY OF THE INVENTION

It is an object of the present invention to provide a new motor arrangement whose motor is suitable for operation in a potentially explosive environment.

In accordance with the present invention, this is achieved in that on the stator of the electric motor, and separated from the permanent magnetic motor by an air gap, at least one galvanomagnetic rotor position sensor is provided for detecting a magnetic field of the permanent magnetic motor whose output signal serves for controlling an electronic commutation device; the current supply of the galvanomagnetic rotor position sensor is realized by an alternating-current (ac) or three-phase current supply system with interconnection of an isolation transformer; and the output signal of the galvanomagnetic sensor is supplied via an opto-coupler to the electronic commutation device.

In a motor arrangement according to the invention an electric motor with a galvanomagnetic sensor is thus used. Between the motor circuit and the sensor circuit a complete electrical isolation is provided by which it is reliably prevented that in a failure situation energy-rich mains voltage can reach the sensor circuit. The actual electronic commutation device of the motor arrangement is preferably arranged external to the electric motor. This makes it possible to electrically separate (isolate) the sensor circuit completely from the coil circuit of the electric motor, for example, on a relatively small printed circuit board mounted within the electric motor. Since the output signal of the sensor is supplied by an opto-coupler to the electronic commutation device, a complete electrical isolation is possible also in this context.

DESCRIPTION OF THE PREFERRED EMBODIMENTS

Figure 1:
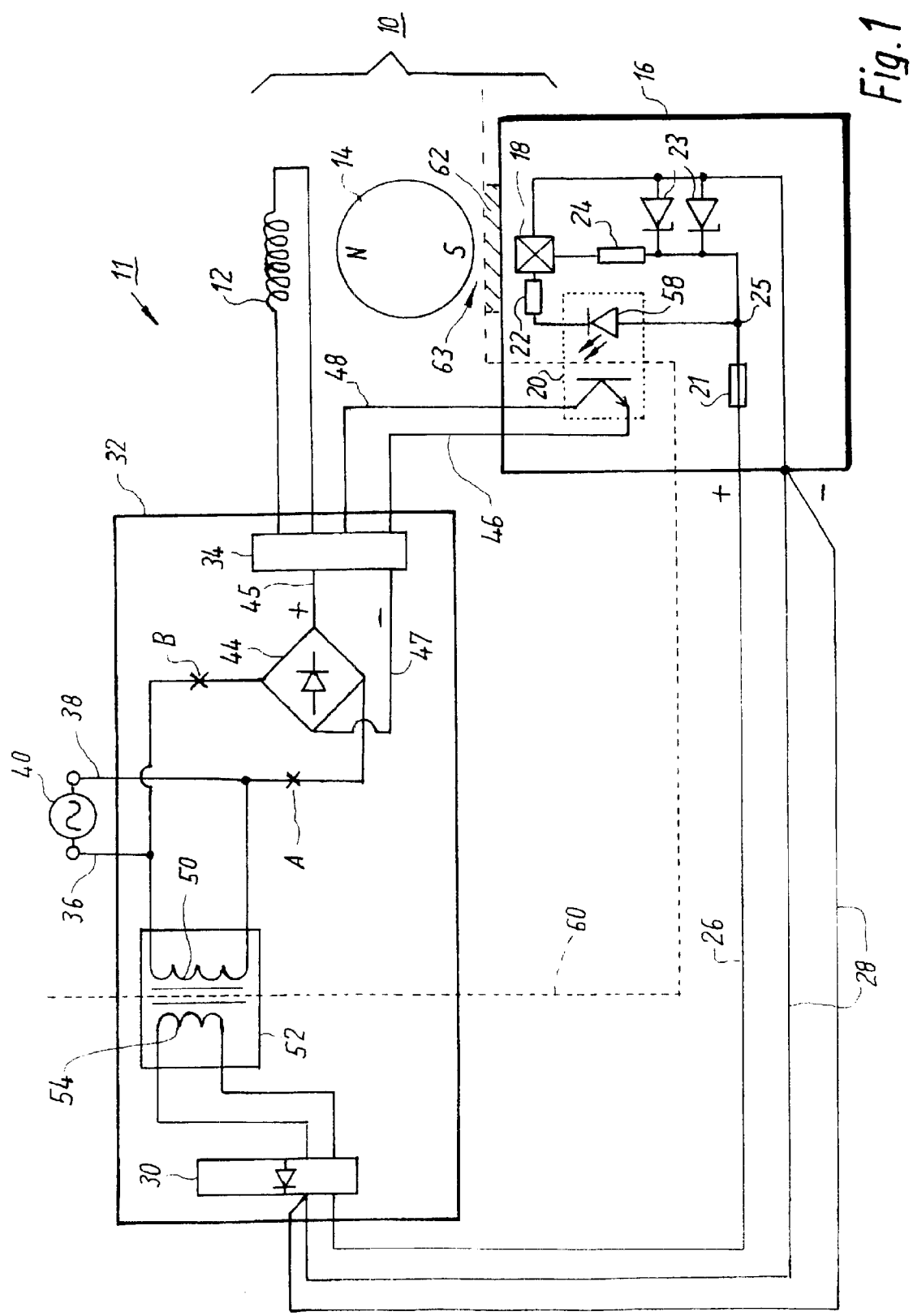
FIG. 1 is a schematic illustration of a preferred embodiment of the motor arrangement of the invention.

In the following description same parts or same-acting parts are referenced with identical reference numerals and are usually described only once.

FIG. 1 shows schematically an embodiment of the motor arrangement 11 according to the invention. To the right, an electronically commutated electric motor (ECM) 10 with a stator coil 12, a permanent-magnetic rotor 14, and a printed circuit board 16, which is arranged within the ECM 10 in an insulated way and on which a Hall IC (integrated circuit) 18 is arranged which is controlled by a magnetic field of the rotor 14, are located. The parts 12, 14, 16, 18, 20 are illustrated only schematically in order to facilitate understanding of the invention. For example, four-pole or six-pole rotors 14 are used in practice.

The printed circuit board 16 supports also an opto-coupler 20, a fuse 21, a resistor 22, two Zener diodes 23, and a resistor 24. It is supplied with direct current (dc) of 10 V via two lines 26, 28 by a rectifier 30 which is arranged on an external printed circuit board 32 on which also the electronic commutation device 34 is arranged to which the coil 12 is connected. This printed circuit board 32 is preferably located external to the ECM 10, conventionally in an explosion-protected housing (pressure-proof housing). The electronic commutation device 34 comprises preferably an electronic limiter for the motor current, as is known, for example, from EP-A2-0739084. The negative line 28 is provided twice in order to provide redundancy.

The printed circuit board 32 is connected in operation by terminals 36, 38 to an alternating current source 40, typically to an alternating current supply system with 230 V, 50 Hz, or to a three-phase supply system. This alternating current is rectified by a rectifier 44 (with an electronic smoothing device, i.e., capacitors and the like) and supplied by a direct-current intermediate circuit 45, 47 to the electronic commutation device 34. The voltage at the direct-current intermediate circuit 45, 47, depending on the type of motor, can be, for example, between 20 V and more than 350 V.

The signals at the output of the opto-coupler 20 are guided via two lines 46, 48 to the electronic commutation device 34 and control in a conventional way the commutation as a function of the position of the rotor 14.

The primary coil 50 of a short-circuit-proof isolation transformer 52 (preferably corresponding to EN 50020, section 8.1) is connected to the terminals 36, 38, and the rectifier 30, which supplies the Hall IC 18 and the opto-coupler 20, is connected to the secondary coil 54.

The positive line 26 is connected via the fuse 21 (for example, 62 mA, 125 V) and a junction 25 with the anode of the LED 58 of the opto-coupler 20 whose cathode is connected by a resistor 22 with the signal output of the Hall IC 18. Moreover, the junction 25 is connected via the resistor 24 with the supply input of the Hall IC 18. The negative line 28 is connected with the negative terminal of the Hall IC 18. Between the junction 25 and the negative line 28 the two Zener diodes 23 are positioned, for example, configured for 5.6 V. This ensures that the voltage in the intrinsically safe circuit cannot become greater than 5.6 V. In a failure situation, the fuse 21 is triggered. The series resistor for the Zener diodes 23 is located at the output of the rectifier 30 on the external printed circuit board 32.

The resistors 22 and 24 (for example, each 1 kΩ) are dimensioned such that for a short circuit the maximum electric power generated thereat is significantly lower than two-thirds of the maximum allowable power loss of these resistors.

Figure 2:
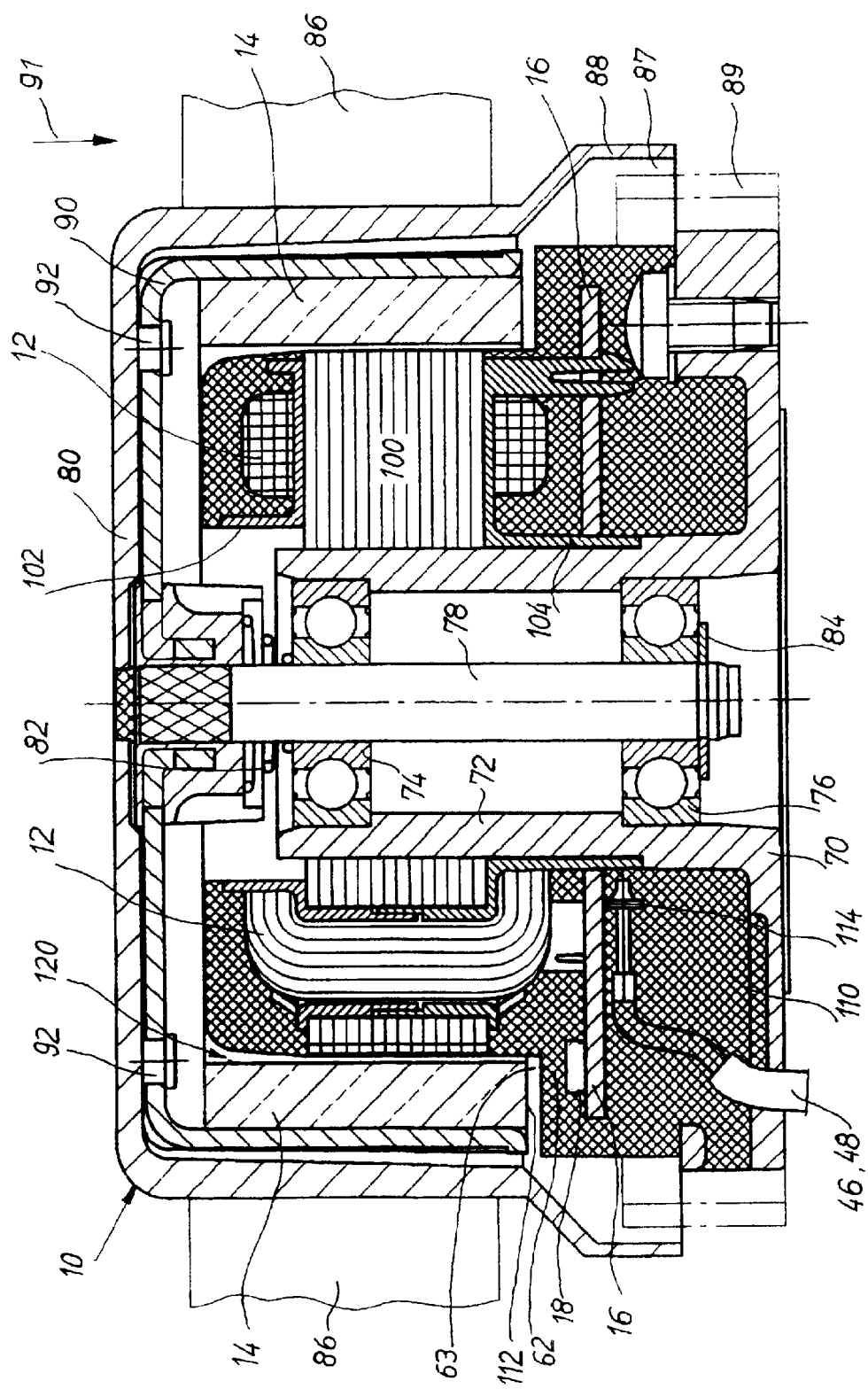
FIG. 2 is a preferred embodiment of an electronically commutated electric motor for use in an arrangement according to FIG. 1.

Reference numeral 60 symbolizes the electrical isolation between the intrinsically safe sensor circuit (below the line 60) and the energy-rich motor circuit (above the separation line 60). This isolation is formed by the isolation transformer 52, the opto-coupler 20, and partially also by an insulation 62 which is arranged in the air gap 63 between the Hall IC 18 and the rotor 14. The insulation 62 is only symbolically illustrated in FIG. 1. It is illustrated in FIG. 2 by means of a preferred example. Preferably, it is provided on the stator. However, it is also possible to provide a corresponding insulation on the rotor 14.

In this context, the following should be noted: for an intrinsically safe electric motor relatively large insulation thicknesses are prescribed by the standard which, for smaller motors and especially for electronically commutated motors, cannot be complied with because the motor would not be functioning any longer. For example, according to the standard, an insulation layer at the location 63 must have a thickness of at least 3 mm but in this case the Hall IC 18 could no longer be controlled by the magnetic field of the rotor 14.

A complete electrical isolation of the printed circuit board 16 from the electrical supply system 40 is achieved by the isolation transformer 52 and the opto-coupler 20 so that the intrinsic safety is also provided when the insulation 62 does not have the prescribed thickness. One can see easily that even an insulation layer 62 of a reduced thickness contributes in this case additionally to the intrinsic safety.

FIG. 2 shows a preferred embodiment of the ECM 10 of FIG. 1, here in the form of an external-rotor motor 10. It has a base part 17 which is formed as a monolithic part of the bearing support tube 72 in which two ball bearings 74, 76 are provided which support a shaft 78 on whose upper end a rotor cup 80 is fastened. A spring 82 generates an initial tension between the upper ball bearing 74 and the rotor cup 80 as well as between the inner rings of the two ball bearings. At the lower end of the shaft 78 a spring ring 84 is provided. The base part 70 and the bearing support tube 72 can also be manufactured of a suitable plastic material or, for example, of diecast aluminum with a magnesium contents of less than 6%.

The rotor cup 80 is comprised, like the base part 70, preferably of a suitable plastic material with embedded carbon fibers in order to prevent static electricity from being generated on the surface of the plastic. The surface resistance is preferably below $10^9 \Omega$, especially preferred in the range of approximately $10^5 \Omega$ to approximately $10^9 \Omega$. Preferably, a plastic material is used which is resistant to a short-term exposure to flames.

The rotor cup 80 supports fan vanes 86 on its external side and is formed with them as a monolithic part. It widens conically in the downward direction to a so-called skirt 88 which cooperates with a stationary part 89 that, as illustrated, projects into this skirt 88 and in this way prevents that foreign bodies can reach the interior of electric motor 10. The flow direction of the air is illustrated by 91, i.e., it flows from the top to the bottom, so that in the area of the opening 87 of the skirt 88 a suction effect is generated which counteracts the introduction of foreign bodies.

In the interior of the rotor cup 80 a cup-shaped part 90 of a material of soft ferromagnetic properties is fastened by means of plastic rivets 92, and the permanent-magnetic rotor 14, preferably a so-called rubber-bonded magnet which is comprised of a mixture of rubber-like substances and suitable hard ferrites, is fastened on the inner side of the part 90. This has the advantage in comparison to a hard permanent magnet that no friction sparks can be generated when friction occurs between the stator 100 and the permanent-magnetic rotor 14.

In the radial space between the permanent magnet of the rotor 14 and the bearing support tube 72 the stator of the electric motor 10 is positioned, comprising: a stator laminate pack 100, which is pressed onto the external side of the bearing support tube 72, a two-part coil body 102,104, and a stator coil 12. (The embodiment shows a single-phase ECM 10 with a single coil 12. It is operated by a two-pulse system, compare, for example, DE 23 46 380, where a corresponding electric motor is described. The invention is suitable naturally in the same way for motors with more than one phase and with more than two current pulses per rotor rotation of 360 electrical degrees.) Below the stator laminate pack 100 and the stator coil 12, the printed circuit board 16 with the Hall IC 18 is located. This printed circuit board 16, like the stator laminate pack 100 and the coil 12, is completely embedded in a very low-conductivity potting compound 110 which also preferably completely encloses the Hall IC 18, the latter being arranged approximately opposite the lower end 112 of the permanent-magnetic rotor 14, i.e., in its stray flux area. In the area of the coil 12 and the other current-carrying parts with energy-rich currents, the potting compound 110 has a thickness of at least 3 mm.

The potting compound 110 serves not only for insulating the coil 12 and the electronic device but also for dissipating electrostatic charges. For this reason, it is of low conductivity. Its surface resistance is preferably in the range of $10^5 \Omega$ to $10^9 \Omega$. In practice, occasionally values of $10^3 \Omega$ may occur. The surface resistance should not be too low so that no disturbing currents flow from the coil 12 to the Hall IC 18 which would disturb the Hall signal. A resistance gradient in the sense that the specific resistivity of the insulation on the surface is lower than in the interior of the insulation is optimal.

In this way, the low-conductivity insulation layer 62 described in connection with FIG. 1 is positioned also between the permanent-magnetic rotor or rotor magnet 14 and the Hall IC 18 and provides a good electrical isolation 60 between the ECM 10 and the sensor circuit and is thus very advantageous for the so-called intrinsic safety of the electric motor 10.

With respect to the details of embedding the stator with the plastic material, in order to be brief, reference is being had to U.S. Pat. No. 5,973,424 wherein a suitable method and suitable materials are described in detail.

The coil 12 is connected via terminals 114 on the printed circuit board 16 with the lines 46, 48 which lead to the electronic commutation device 34.

The potting material 110 extends preferably also through the air gap 120 of the electric motor 10 and covers the air gap side of the stator laminate pack 100 completely; compare U.S. Pat. No. 5,973,424.

An intrinsic safety ECM 10 is obtained in this way whose electronic commutation device 34 is preferably arranged external to the electric motor 10 and must not be intrinsically safe because between it and the electronic sensor circuit (on the printed circuit board 16) a strict electrical isolation 60 is provided. The printed circuit board 32 can be conventionally arranged in an explosion-protected housing external to the ECM 10. A preferred arrangement of such ECM 10 is a so-called tube fan, i.e., a fan which is mounted in the tube of a venting device in which explosive media may be present.

If needed, at the locations A, B (FIG. 1) between the electrical supply system 40 and the rectifier 44 an isolation transformer (analog to the transformer 52) can be provided which electrically isolates the electronic commutation device 34 from the electrical supply system 40. This makes possible a lower voltage for the intermediate circuit between the lines 45, 47, for example, 20 V. In addition, many variations and modifications are possible without leaving the gist of the invention.

While specific embodiments of the invention have been shown and described in detail to illustrate the inventive principles, it will be understood that the invention may be embodied otherwise without departing from such principles.

What is claimed is:

1. A motor arrangement (11) comprising:
    an electronically commutated motor (10) of an explosion-protected design and comprising a permanent-magnetic rotor (14), a stator (100), and an electronic commutation device (34);
    at least one galvanomagnetic rotor position sensor (18) arranged on said stator (100) and separated from said permanent-magnetic rotor (14) by an air gap (63), wherein said at least one galvanomagnetic rotor position sensor (18) is configured to detect a magnetic field of said permanent-magnetic rotor (14) and emits an output signal controlling said electronic commutation device (34);
    an opto-coupler (20) configured to transmit said output signal of said at least one galvanomagnetic rotor position sensor (18) to said electronic commutation device (34);
    a current system supply (40), selected from the group consisting of an alternating-current supply system or a three-phase current supply system, configured to supply current to said at least one galvanomagnetic rotor position sensor (18);
    an isolating transformer (52) interconnected between said at least one galvanomagnetic rotor position sensor (18) and said current supply (4).

2. The motor arrangement according to claim 1, wherein said isolating transformer (52) is an intrinsically safe transformer.

3. The motor arrangement according to claim 1, wherein said at least one galvanomagnetic rotor position sensor (18) is a Hall IC.

4. The motor arrangement according to claim 1, further comprising a printed circuit board (16) and a low-conductivity potting compound (62, 110) enclosing said printed circuit board (16), wherein said at least one galvanomagnetic rotor position sensor (18) is arranged on said printed circuit board (16).

5. The motor arrangement according to claim 4, wherein said at least one galvanomagnetic rotor position sensor (18) is enclosed by said low conductivity potting compound (62, 110).

6. The motor arrangement according to claim 4, wherein said low-conductivity potting compound (62) extends into said air gap (63) between said permanent-magnetic rotor (14) and said at least one galvanomagnetic rotor position sensor (18).

7. The motor arrangement according to claim 4, wherein said stator is comprised of a laminated stator core (100) and a stator coil (12), wherein said low-conductivity potting compound (110) encloses said laminated stator core (100) and said stator coil (12).

8. The motor arrangement according to claim 4, wherein said low conductivity potting compound (62, 110) has a surface resistance in the range of approximately $10^9 \Omega$ or less.

9. The motor arrangement according to claim 1, wherein said electric motor (10) is an external-rotor motor comprising a rotor cup (80) having a free end with a radially widened portion (88).

10. The motor arrangement according to claim 9, comprising fan vanes (86) arranged externally on said rotor cup (80) and configured to convey air in a conveying direction (91).

11. The motor arrangement according to claim 10, wherein said radially widened portion (88) is located at a downstream end of a conveying path in said conveying direction (91).

12. The motor arrangement according to claim 10, wherein said rotor cup (80) and said fan vanes (86) consist of plastic material and are formed as a monolithic part.

13. The motor arrangement according to claim 10, further comprising a ferromagnetically soft magnetic return member (90) fastened inside said rotor cup (80) consisting of plastic material, wherein said magnetic return member (90) is a support and a magnetic yoke for a permanent magnet (14) of said rotor.

14. The motor arrangement according to claim 10, wherein said rotor cup (80) consists of a low conductivity plastic material having a surface resistance of less than $10^9 \Omega$.

15. The motor arrangement according to claim 14, wherein said plastic material contains carbon fibers for reducing said surface resistance.

16. The motor arrangement according to claim 10, wherein said fan vanes (86) form a fan arrangement of a tube fan configured to be arranged inside a tube through which gas flows.

17. The motor arrangement according to claim 1, further comprising a current limiter (34) for current supplied to said stator (12).

18. The motor arrangement according to claim 1, wherein said electronic commutation device (34) is arranged at least partially external to said electronically commutated motor (10).

19. The motor arrangement according to claim 18, wherein said electronic commutation device (34) is arranged explosion-protected in a pressure-resistant housing external to said electronically commutated motor (10).

20. The motor arrangement according to claim 1, wherein said permanent magnetic rotor (14) is comprised of a rubber-bonded magnet.

* * * * *